US012804054B2

(12) United States Patent
Mukherjee et al.

(10) Patent No.: US 12,804,054 B2
(45) Date of Patent: Nov. 17, 2026

(54) METHODS, SYSTEMS, AND COMPUTER READABLE MEDIA FOR INTELLIGENT ADMISSION CONTROL IN SERVICE-BASED INTERFACE NETWORK FUNCTIONS

(71) Applicant: Oracle International Corporation, Redwood Shores, CA (US)

(72) Inventors: Abhishek Mukherjee, Bangalore (IN); Vivek Pant, Bangalore (IN); Rohan Taneja, Delhi (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 20 days.

(21) Appl. No.: 19/009,897

(22) Filed: Jan. 3, 2025

(65) Prior Publication Data

US 2026/0197378 A1 Jul. 9, 2026

(51) Int. Cl.
*H04L 67/62* (2022.01)
*H04L 67/02* (2022.01)

(52) U.S. Cl.
CPC .............. *H04L 67/62* (2022.05); *H04L 67/02* (2013.01)

(58) Field of Classification Search
CPC ................................ H04L 67/62; H04L 67/02
See application file for complete search history.

(56) References Cited

U.S. PATENT DOCUMENTS 10,592,317 B2 3/2020 Baines et al.
11,140,047 B2 10/2021 Shan
11,811,863 B2 11/2023 Shariat
11,917,016 B2 2/2024 Krishan
12,500,826 B2 12/2025 Sofuoglu
2018/0262924 A1 9/2018 Dao et al.
(Continued)

FOREIGN PATENT DOCUMENTS

CN 114980200 A 8/2022
IN 202241006739 A 11/2023

OTHER PUBLICATIONS

Notice of Allowance for U.S. Appl. No. 18/934,178 (Apr. 20, 2026).
(Continued)

*Primary Examiner* — Chris Parry
*Assistant Examiner* — Steven C Nguyen
(74) *Attorney, Agent, or Firm* — Jenkins, Taylor & Hunt, P.A.

(57) ABSTRACT

A method for intelligent admission control in SBI NFs includes receiving, at an SBI NF operating as an HTTP -server, an SBI request message and determining sender timestamp and a maximum response time for the SBI request message. The method further includes determining, by the SBI NF operating as the HTTP server, a predicted response time for processing the SBI request message, the predicted response time including a predicted time for delivering an SBI response message to the SBI request message to an SBI NF operating as an HTTP client. The method further includes determining whether a sum of a current time and the predicted response time exceeds a sum of the sender timestamp and the maximum response time and aborting processing of the SBI request message when the sum of the current time and the predicted response time exceeds the sum of the sender timestamp and the maximum response time.

20 Claims, 10 Drawing Sheets

(56) References Cited

U.S. PATENT DOCUMENTS

| | | | | |
|---|---|---|---|---|
| 2019/0222489 | A1 | 7/2019 | Shan | |
| 2020/0288296 | A1 | 9/2020 | Fiorese et al. | |
| 2020/0313999 | A1 | 10/2020 | Lee et al. | |
| 2021/0021494 | A1 | 1/2021 | Yao et al. | |
| 2023/0065199 | A1 | 3/2023 | Khare et al. | |
| 2023/0171182 | A1 | 6/2023 | Goel et al. | |
| 2023/0269608 | A1 * | 8/2023 | Puente Pestaña | H04W 24/02 370/252 |
| 2023/0300200 | A1 | 9/2023 | Krishan | |
| 2023/0359528 | A1 * | 11/2023 | Mouroulis | H04L 67/02 |
| 2024/0031430 | A1 | 1/2024 | Shariat | |
| 2024/0172035 | A1 | 5/2024 | Chunduri et al. | |
| 2024/0187878 | A1 | 6/2024 | Chu et al. | |
| 2024/0298225 | A1 | 9/2024 | Hyde et al. | |
| 2024/0348523 | A1 | 10/2024 | Sofuoglu | |
| 2025/0071094 | A1 * | 2/2025 | Rajput | H04L 63/0263 |
| 2025/0175491 | A1 * | 5/2025 | Mohan Raj | H04L 63/1441 |
| 2025/0184238 | A1 | 6/2025 | Singh et al. | |
| 2025/0203433 | A1 | 6/2025 | Kheirkhah et al. | |
| 2025/0234187 | A1 * | 7/2025 | Mohan Raj | H04W 8/26 |
| 2025/0267070 | A1 | 8/2025 | An et al. | |
| 2026/0067193 | A1 * | 3/2026 | Rajput | H04L 43/0852 |
| 2026/0067752 | A1 | 3/2026 | Chellasamy et al. | |
| 2026/0122142 | A1 | 4/2026 | Rajput et al. | |

OTHER PUBLICATIONS

Non-Final Office Action for U.S. Appl. No. 18/826,073 (Feb. 19, 2026).

3rd Generation Partnership Project; Technical Specification Group Core Network and Terminals, 5G System; Network Function Repository Services; Stage 3 (Release 19) 3GPP TS 29.510 V19.0.0 (Sep. 2024).

3rd Generation Partnership Project; Technical Specification Group Core Network and Terminals; 5G System; Technical Realization of Service Based Architecture; Stage 3 (Release 19) 3GPP TS 29.500 V19.0.0 (Sep. 2024).

3rd Generation Partnership Project; Technical Specification Group Core Network and Terminals; 5G System; Session Management Policy Control Service; Stage 3 (Release 19) 3GPP TS 29.512 V19.0.0 (Sep. 2024).

3rd Generation Partnership Project; Technical Specification Group Core Network and Terminals; 5G System; Binding Support management Service; Stage 3 (Release 19) 3GPP TS 29.521 V19.0.0 (Sep. 2024).

3rd Generation Partnership Project; Technical Specification Group Core Network and Terminals; 5G System; Usage of the Unified Data Repository service for Policy Data, Application Data, and Structured Data for Exposure; Stage 3 (Release 19) 3GPP TS 29.519 V19.0.1 (Sep. 2024).

3rd Generation Partnership Project; Technical Specification Group Core Network and Terminals; 5G System; Spending Limit Control Service; Stage 3 (Release 19) 3GPP TS 29.594 V19.0.0 (Sep. 2024).

"5G; 5G System; Session Management Services; Stage 3 (3GPP TS 29.502 version 16.6.0 Release 16)", ETSI TS 129 502, V16.6.0, pp. 1-283 (Jan. 2021).

"Clarifications for Indirection Communications", Nokia, 3GPP TSG-CT WG4 Meeting #99e, E-Meeting, C4-204189, pp. 1-5 (Aug. 18-28, 2020).

"5G; 5G System; Technical Realization of Service Based Architecture; Stage 3 (3GPP TS 29.500 version 15.3.0 Release 15)", ETSI TS 129 500, V15.3.0, pp. 1-36 (Jul. 2019).

"3rd Generation Paternership Project; Technical Specification Group Core Network and Terminals; 5G System; Technical Realization of Service Based Architecture; Stage 3 (Release 18)", 3GPP TS 29.500, V18.7.0, pp. 1-151 (Sep. 2024).

Commonly-Assigned, co-pending U.S. Appl. No. 18/816,840 for "Methods, Systems, and Computer Readable Media for Dynamically Adjusting Producer Network Function (NF) Service-Based Interface (SBI) Response Message Processing Timeouts at Service Communication Proxy (SCP) or Consumer NF," (Unpublished, filed Aug. 27, 2024).

"3rd Generation Partnership Project; Technical Specification Group Services and System Aspects; Procedures for the 5G System (5GS); Stage 2 (Release 18)", 3GPP TS 23.502, V18.6.0, pp. 1-717 (Jun. 2024).

"3rd Generation Partnership Project; Technical Specification Group Services and System Aspects; System architecture for the 5G System (5GS); Stage 2 (Release 19)", 3GPP TS 23.501, V19.0.0, pp. 1-722 (Jun. 2024).

"3rd Generation Partnership Project; Technical Specification Group Core Network and Terminals; 5G System; Technical Realization of Service Based Architecture; Stage 3 (Release 18)", 3GPP TS 29.500, V18.6.1, pp. 1-151 (Aug. 2024).

"3rd Generation Partnership Project; Technical Specification Group Core Network and Terminals; 5G System; Network Function Repository Services; Stage 3 (Release 18)", 3GPP TS 29.510 V18.7.0, pp. 1-426 (Jun. 2024).

Commonly-Assigned, co-pending U.S. Appl. No. 18/826,073 for "Methods, Systems, and Computer Readable Media for Network Analytics Data Director (NADD)—Assisted Producer Network Function (NF) Selection " (Unpublished, filed Sep. 5, 2024).

Commonly-Assigned, co-pending U.S. Appl. No. 18/934,178 for "Methods, Systems, and Computer Readable Media for Network Analytics Data Director (NADD)—Informed Automatic Configuration of Maximum Response Times." (Unpublished filed Oct. 31, 2024).

Esfandiari, "Powering the Autonomous 5G Core", Pipeline Publishing, L.L.C., vol. 19, Issue 11, pp. 1-4 (2023).

Nadar, et al., "Enhancing Network Data Analytics Functions: Integrating AlaaS with ML Model Provisioning", 2024 22nd Mediterranean Communication and Computer Networking Conference (MedComNet). IEEE, pp. 1-4 (2024).

Garcia-Martin, et al., "Network automation and data analytics in 3gpp 5g systems." IEEE Network 38.4 (2023): 182-189.

Chouman, et al., "A Modular, End-to-End Next-Generation Network Testbed: Towards a Fully Automated Network Management Platform", arXiv.org, arXic:2403.15376v1, pp. 1-47 (Mar. 22, 2024).

Nokia, "Clarifications for Indirect Communications", 3GPP TSG-CT WG4 Meeting #99e, pp. 1-5 (Aug. 18-28, 2020).

Fielding, et al., "Hypertext Transfer Protocol (HTTP/1.1): Message Syntax and Routing", Internet Engineering Task Force (IETF), RFC 7230 (Jun. 2014).

"3rd Generation Partnership Project; Technical Specification Group Core Network and Terminals; 5G System; Network Function Repository Services; Stage 3 (Release 19)", 3GPP TS 29.510, V19.0.0, pp. 1-435 (Sep. 2024).

"3rd Generation Partnership Project; Technical Specification Group Core Network and Terminals; 5G System; Technical Realization of Service Based Architecture; Stage 3 (release 18)", 3GPP TS 29.500, V18.6.0, pp. 1-151 (Jun. 2024).

Notification of Transmittal of the International Search Report and the Written Opinion of the International Searching Authority, or the Declaration for International Patent Application Serial No. PCT/US2025/059711 (Apr. 21, 2026).

* cited by examiner

METHODS, SYSTEMS, AND COMPUTER READABLE MEDIA FOR INTELLIGENT ADMISSION CONTROL IN SERVICE-BASED INTERFACE NETWORK FUNCTIONS

TECHNICAL FIELD

The subject matter described herein relates to avoiding unnecessary processing in communication networks. More particularly, the subject matter described herein relates to methods, systems, and computer readable media for intelligent admission control in service-based interface (SBI) network functions (NFs) to avoid unnecessary processing of SBI request messages

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF service instance is a service instance of a producer NF that provides one or more services. A given producer NF may include more than one NF service instance. It should also be noted that multiple NF service instances can share the same service endpoint.

NFs register with an NF repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

Service communication proxies (SCPs) route messages between NF instances. An SCP can also invoke the NF discovery service operation to learn about available NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instance.

NFs use hypertext transfer protocol (HTTP) (primarily version 2) for invoking service operations. For example, an NF operating as an HTTP client or consumer NF invokes a service operation on an NF operating as an HTTP server or producer NF by sending a service-based interface (SBI) request message to the NF operating at the HTTP server. 3GPP TS 29.500 allows the NF operating as the HTTP client to specify a maximum time for processing and returning a response to the SBI request message using values carried in a 3gpp-Sbi-Max-Rsp-Time header and a 3gpp-Sbi-Sender-Timestamp header. The value carried in the 3gpp-Sbi-Max-Rsp-Time header is a value in milliseconds after the time specified in the 3gpp-Sbi-Sender-Timestamp header after which the sender will consider the SBI request message as timed out. When an SBI NF operating as an HTTP server receives an SBI request message that has timed out, the SBI NF operating as the HTTP server can reject the message and avoid wasting processing resources on the timed out SBI request message. However, when the SBI NF operating as the HTTP server receives an SBI request message that has not timed out but the NF operating as the HTTP server is unable to complete processing of the SBI request message and deliver a response to the SBI NF operating as the HTTP client within the maximum response time, processing resources of the SBI NF operating as the HTTP server are unnecessarily wasted.

Accordingly, in light of these and other difficulties, there exists a need for intelligent admission control of SBI request messages at SBI NFs.

SUMMARY

A method for intelligent admission control in service-based interface (SBI) network functions (NFs) includes receiving, at an SBI NF operating as a hypertext transfer protocol (HTTP) server, an SBI request message. The method further includes determining, by the SBI NF operating as the HTTP server, sender timestamp and a maximum response time for the SBI request message. The method further includes determining, by the SBI NF operating as the HTTP server, a predicted response time for processing the SBI request message, the predicted response time including a predicted time for delivering an SBI response message to the SBI request message to an SBI NF operating as an HTTP client. The method further includes determining, by the SBI NF operating as the HTTP server, whether a sum of a current time and the predicted response time exceeds a sum of the sender timestamp and the maximum response time. The method further includes aborting, by the SBI NF operating as the HTTP server, processing of the SBI request message when the sum of the current time and predicted response time exceeds the sum of the sender timestamp and the maximum response time.

According to another aspect of the subject matter described herein, receiving the SBI request message includes receiving an SBI request message at a time before a time equal to the sum of the sender timestamp and the maximum response time.

According to another aspect of the subject matter described herein, determining the sender timestamp and the maximum response time for the SBI request message includes reading the sender timestamp from a 3gpp-Sbi-Sender-Timestamp header and reading the maximum response time from a 3gpp-Sbi-Max-Rsp-Time header of the SBI request message.

According to another aspect of the subject matter described herein, determining the predicted response time for the SBI request message includes calculating a predicted minimum response time required for completing processing of the SBI request message and delivering the SBI response message to the SBI NF operating as the HTTP client.

According to another aspect of the subject matter described herein, calculating the predicted minimum response time includes calculating a real-time mean processing latency for the SBI request message.

According to another aspect of the subject matter described herein, calculating the predicted minimum response time includes calculating a historical response time for the SBI request message given a service operation type of the SBI request message.

According to another aspect of the subject matter described herein, calculating the predicted minimum response time includes calculating an average of the real-time mean processing latency and the historical response time.

According to another aspect of the subject matter described herein, calculating the average includes weighting at least one of the real-time mean processing latency and the historical response time.

According to another aspect of the subject matter described herein, the method for intelligent admission control includes communicating the predicted response time by the SBI NF operating as the HTTP server and to the SBI NF operating as the HTTP client.

According to another aspect of the subject matter described herein, the method for intelligent admission control includes, when the SBI NF operating as the HTTP server determines that the sum of the current time and the predicted processing time does not exceed the sum of the sender timestamp and the maximum response time, processing the SBI request message and transmitting the SBI response message to the NF operating as the HTTP client.

According to another aspect of the subject matter described herein, a system for intelligent admission control in service-based interface (SBI) network functions (NFs) is provided. The system includes an NF including at least one processor and a memory, the NF being configured to operate as an HTTP server. The system further includes a predicted response time determiner executable by the at least one processor for receiving an SBI request message, determining a sender timestamp and a maximum response time for the SBI request message, determining a predicted response time for processing the SBI request message, the predicted response time including a predicted time for delivering an SBI response message to the SBI request message to an SBI NF operating as an HTTP client, determining, whether the a sum of a current time and the predicted response time exceeds the sum of the sender timestamp and the maximum response time, and aborting processing of the SBI request message when the sum of the current time and the predicted response time exceeds the sum of the sender timestamp and the maximum response time.

According to another aspect of the subject matter described herein, the predicted response time determiner receives the SBI request before a time equal to the sum of the sender timestamp and the maximum response time. According to another aspect of the subject matter described herein, the predicted response time determiner is configured to determine the sender timestamp and the maximum response time by reading the sender timestamp from a 3gpp-Sbi-Sender-Timestamp header of the SBI request message and reading the maximum response time from a 3gpp-Sbi-Max-Rsp-Time header of the SBI request message.

According to another aspect of the subject matter described herein, the predicted response time determiner is configured to determine the predicted response time for the SBI request message by calculating a predicted minimum response time required for completing processing of the SBI request message and delivering the SBI response message to the SBI NF operating as the HTTP client.

According to another aspect of the subject matter described herein, the predicted response time determiner is configured to calculate the predicted minimum response time by calculating a real-time mean processing latency for the SBI request message.

According to another aspect of the subject matter described herein, the predicted response time determiner is configured to calculate the predicted minimum response time by calculating a historical response time for the SBI request message given a service operation type of the SBI request message.

According to another aspect of the subject matter described herein, the predicted response time determiner is configured to calculate the predicted minimum response time by calculating an average of the real-time mean processing latency and the historical response time.

According to another aspect of the subject matter described herein, the predicted response time determiner is configured to calculate the average by weighting at least one of the real-time mean processing latency and the historical response time.

According to another aspect of the subject matter described herein, the predicted response time determiner is configured to communicate the predicted response time to the SBI NF operating as the HTTP client.

According to another aspect of the subject matter described herein, a non-transitory computer readable medium having stored thereon executable instructions that when executed by a processor of a computer control the computer to perform steps is provided. The steps include receiving, at a service-based interface (SBI) NF operating as a hypertext transfer protocol (HTTP) server, an SBI request message. The steps further include determining, by the SBI NF operating as the HTTP server, a sender timestamp and a maximum response time for the SBI request message. The steps further include determining, by the SBI NF operating as the HTTP server, a predicted response time for processing the SBI request message, the predicted response time including a predicted time for delivering an SBI response message to the SBI request message to an SBI NF operating as an HTTP client. The steps further include determining, by the SBI NF operating as the HTTP server, whether a sum of a current time and the predicted response time exceeds a sum of the sender timestamp and the maximum response time. The steps further include aborting, by the SBI NF operating as the HTTP server, processing of the SBI request message when the sum of the current time and the predicted response time exceeds the sum of the sender timestamp and the maximum response time.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer-readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
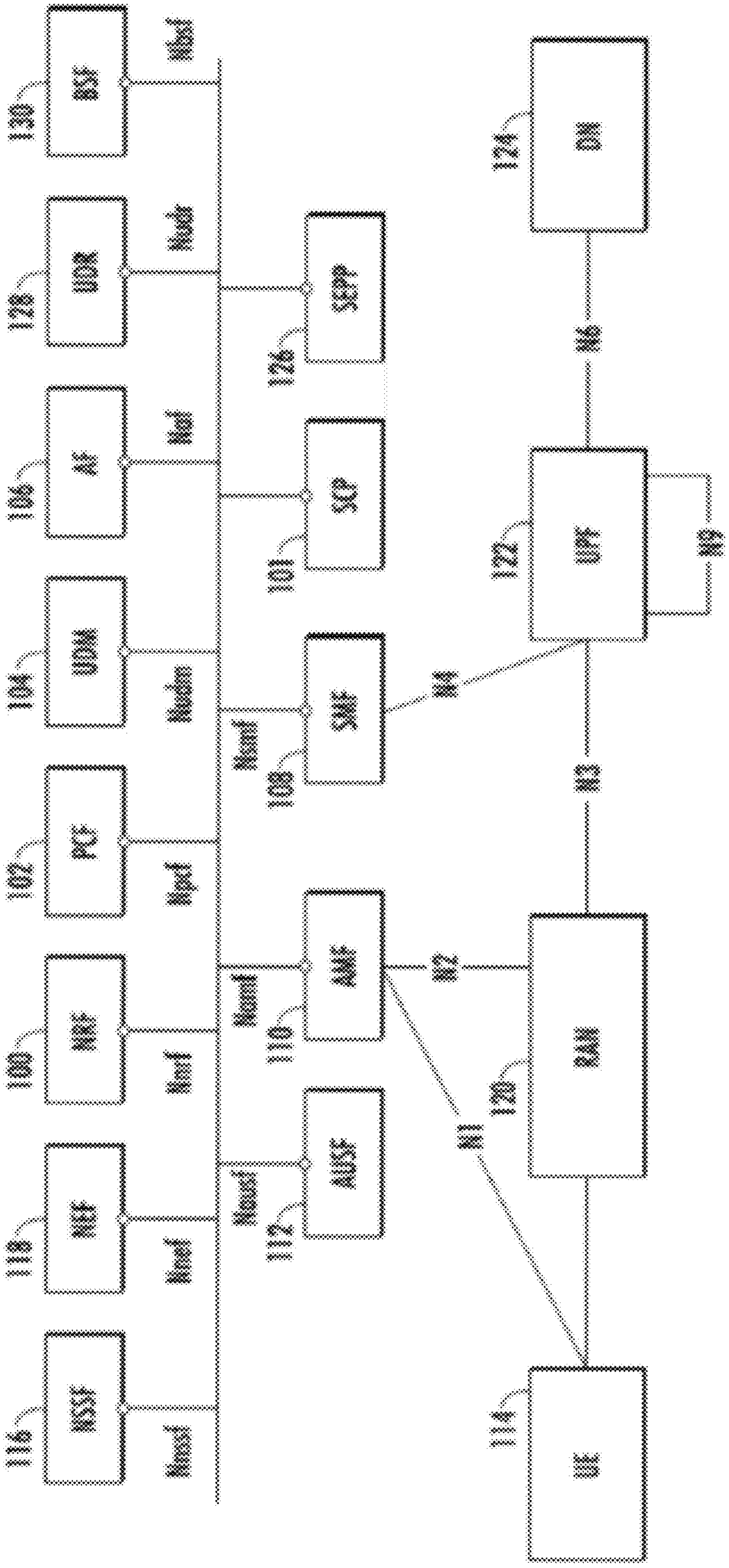
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to producer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As stated above, one problem that can occur with SBI communications is that an SBI request that has not timed out may be received by an SBI NF operating as an HTTP server, but the SBI NF acting as the HTTP server may not be able to complete processing of the request and/or delivery of a response within the timeout period for the request. An overview of SBI communications and SBI message processing timeouts will now be described.

SBI Communication Overview

SBI network functions communicate using the HTTP protocol and hence can be classified as HTTP clients and HTTP servers, depending on the direction of messaging. HTTP clients, in general, when sending a request message to an HTTP server, start a timer to define a maximum amount of time up to which the HTTP client waits for the response from the HTTP server. This duration up to which an HTTP client may wait for a response is generally called a request timeout and is decided based on a number of factors, including, but not limited to, network bandwidth, server processing latency, communication payload size, etc. If a response is not received in time, the HTTP client may free the resources allocated for the particular HTTP transaction at the transport and/or application layer and proceed with a failure handling procedure.

An SBI network function (operating as an HTTP client), when sending a request message to another network function (operating as an HTTP server), has the capability to indicate to the latter an instance of time up to which the HTTP client may wait for a response. 3GPP has standardized this procedure in 3GPP TS 29.500 via the following headers:

3Gpp-Sbi-Sender-Timestamp

The header contains the date and time (with millisecond granularity) at which an HTTP request or response is originated.

Example: 3gpp-Sbi-Sender-Timestamp: Sun, 4 Aug. 2019 08:49:37.845 GMT

3Gpp-Sbi-Max-Rsp-Time

The header indicates the duration, expressed in milliseconds since the request was originated, that the HTTP client waits for a response.

Example: 3gpp-Sbi-Max-Rsp-Time: 10000

3GPP TS 29.500, clause 6.11.2, describes the detection and handling of requests which have timed out at the HTTP client. According to 3GPP TS 29.500, an HTTP client originating a request may include in the request the 3gpp-Sbi-Sender-Timestamp and the 3gpp-Sbi-Max-Rsp-Time headers indicating respectively the absolute time at which the request is originated and the maximum time period to complete the processing of the request. The headers together indicate the absolute time at which the request times out at the HTTP client Upon receipt of a request which contains the 3gpp-Sbi-Sender-Timestamp and the 3gpp-Sbi-Max-Rsp-Time headers, the HTTP server should check that the request has not already timed out at the originating HTTP client. The HTTP server may perform additional similar checks during the processing of the request, e.g., upon receipt of a response from the next upstream NF service.

Based on local configuration, the NF operating as the HTTP server may reject a request that is known to have timed out with the HTTP status code "504 Gateway Timeout" and the protocol error "TIMED_OUT_REQUEST". The NF acting as the HTTP server may alternatively drop the request. 3GPP TS 29.500 does not specify behavior at the NF operating as the HTTP server when an SBI request is received before a time equal to the sum of the sender timestamp and the maximum response time but processing of the request and/or delivery of a response to the HTTP client cannot be completed before the time equal to the sum of the sender timestamp and the maximum response time.

Figure 2:
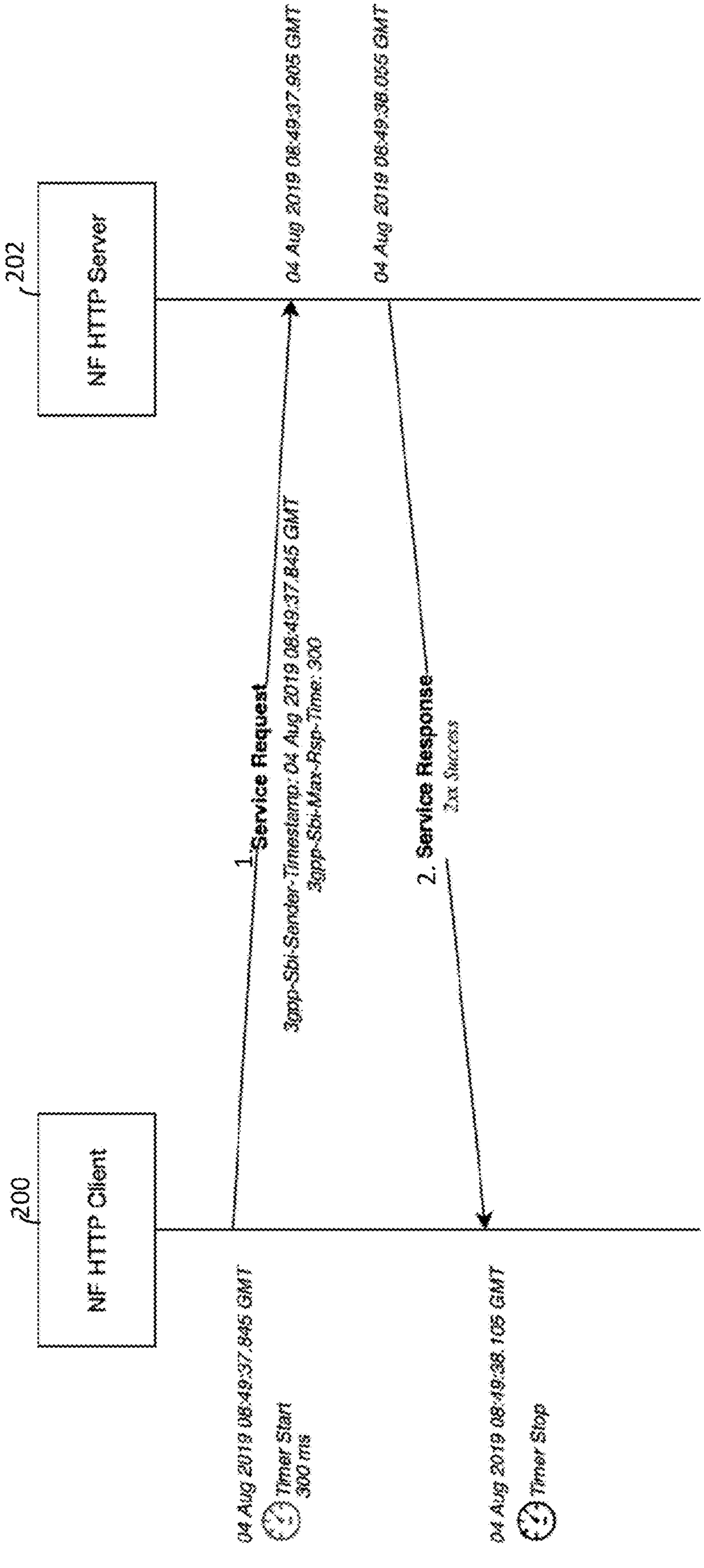
FIG. 2 is a message flow diagram illustrating exemplary messages exchanged when an NF operating as an HTTP client sends an SBI request to an NF operating as an HTTP server and the NF operating as the HTTP server receives and processes the SBI request and returns an SBI response prior to expiry of the maximum response time.

FIG. 2 is a message flow diagram illustrating exemplary messages exchanged when an NF operating as an HTTP client sends an SBI request to an NF operating as an HTTP server, and the NF operating as the HTTP server receives and processes the SBI request and returns an SBI response prior to expiry of the maximum response time (i.e., before the time equal to the sum of the sender timestamp and the maximum response time). Referring to FIG. 2, in step 1, an NF 200 operating as an HTTP client generates and sends an SBI request message to an NF 202 operating as an HTTP server. NF 200 operating as the HTTP client includes in the SBI request a 3gpp-Sbi-Sender-Timestamp header with a timestamp value indicating the time that the SBI request message was transmitted and a 3gpp-Sbi-Max-Rsp-Time header value of 300 ms. NF 202 operating as the HTTP server receives the SBI request at the time 4 Aug. 2019 08:49:37:905 GMT. NF 202 operating as the HTTP server reads the 3gpp-Sbi-Sender-Timestamp value from the SBI request message, adds the 3gpp-Sbi-Max-Rsp-Time header value to the 3gpp-Sbi-Sender-Timestamp value, and determines that the sum is 4 Aug. 2019 08:49:37.845+300=4 Aug. 2019 08:49:38.145, which is after the time of receipt of the SBI request of 4 Aug. 2019 08:49:37:905. Because the sum of the sender timestamp and the maximum response time is after the time of receipt of the SBI request message, in step 2, NF 202 operating as the HTTP server processes the SBI request and sends a success response message to NF 200 operating as the HTTP client. NF 200 operating as the HTTP client receives the SBI response message at 4 Aug. 2019 08:49:38.105, which is before the time equal to the sum of the sender timestamp and the maximum response time, i.e., before 4 Aug. 2019 08:49:38.145. Accordingly, NF 200 operating as the HTTP client successfully processes the response and stops the timer associated with the timeout interval.

Figure 3:
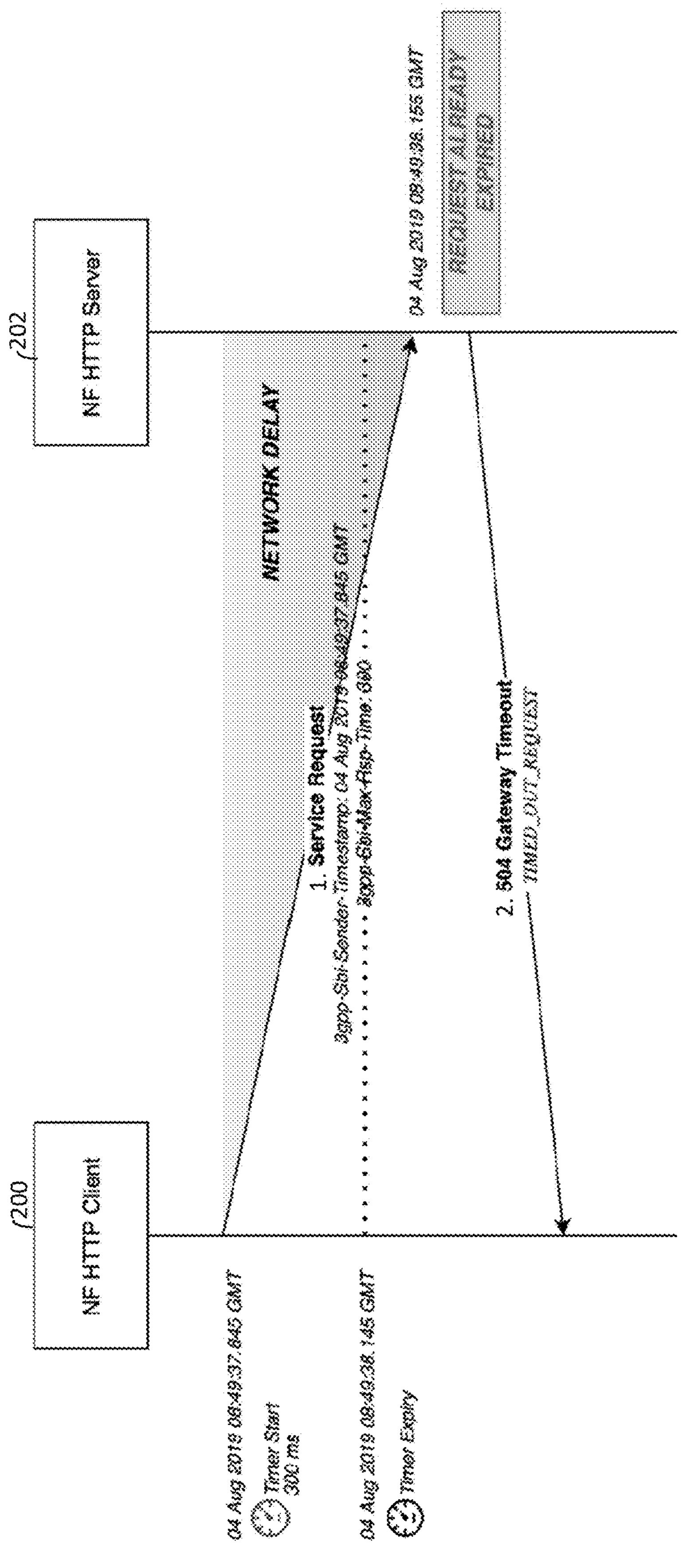
FIG. 3 is a message flow diagram illustrating exemplary messages exchanged when an NF operating as an HTTP client sends an SBI request to an NF operating as an HTTP server, and the NF operating as the server receives the SBI request after expiry of the maximum response time.
Figure 4:
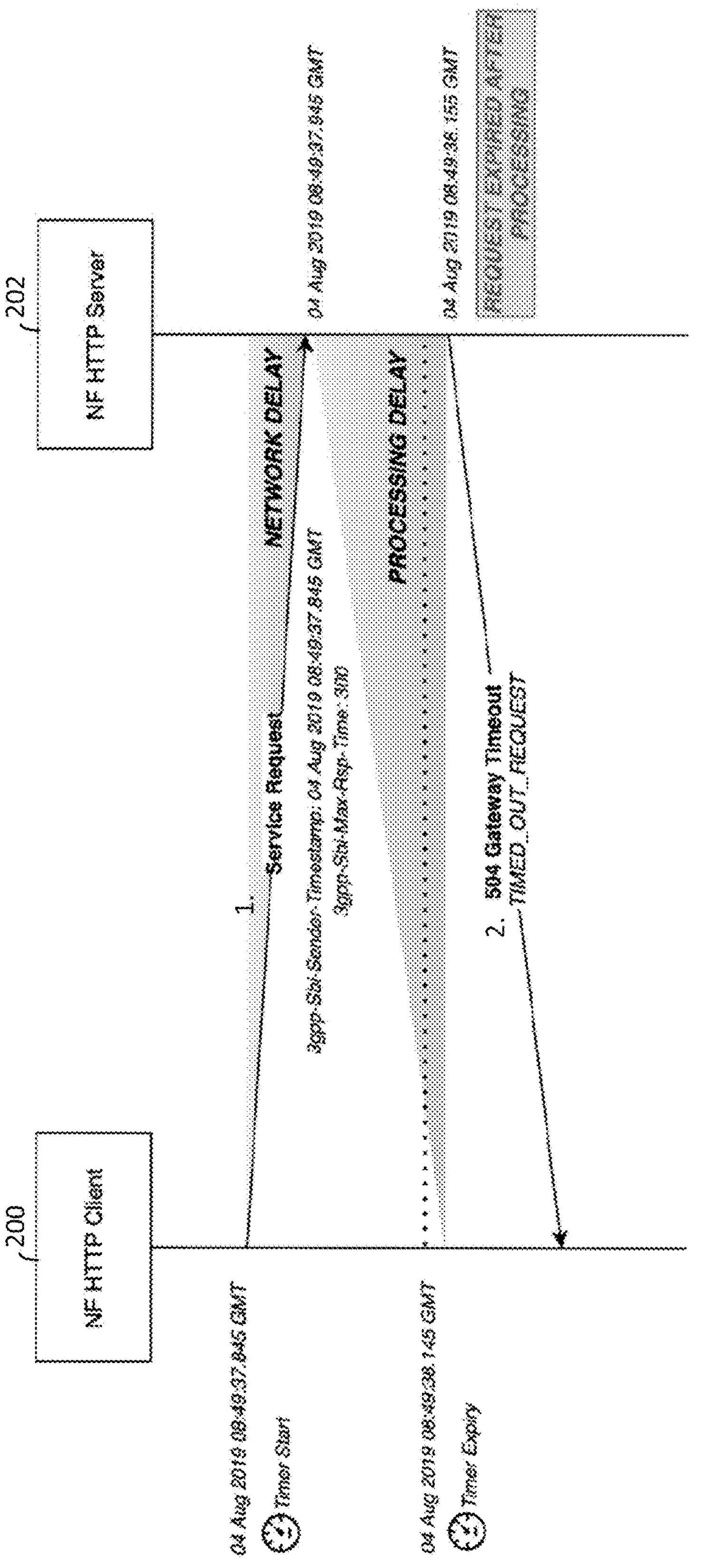
FIG. 4 is a message flow diagram illustrating exemplary messages exchanged when an SBI request is received by an NF operating as an HTTP server prior to expiry of the maximum response time but the NF operating as the HTTP server fails to complete processing of the SBI request prior to the expiry of the maximum response time.

The purpose of having the HTTP server detect and handle a case where the HTTP client may have timed out is to reduce the resources consumed on network functions and network bandwidth utilization in the case where the HTTP client has timed out and is no longer interested in the server's response. 3GPP has defined a procedure to detect an HTTP client's timeout value and reject the request under the following conditions:

1. The request message is delayed in transit, i.e., the request message is received by the HTTP server after the expiry of the maximum response time. The HTTP server should detect this condition and abort the processing of such an expired request on arrival. FIG. 3 described below depicts this condition.
2. The request message is received in time by the HTTP server, however, by the time the processing is completed, the maximum response time has expired. The HTTP server should detect this condition and abort the processing of such an expired request on arrival. FIG. 4 described below depicts this condition.

FIG. 3 is a message flow diagram illustrating exemplary messages exchanged when an NF operating as an HTTP client sends an SBI request to an NF operating as an HTTP server, and the NF operating as the HTTP server receives the SBI request after expiry of the maximum response time. Referring to FIG. 3, in step 1, NF 200 operating as the HTTP client generates and sends an SBI request message to NF 202 operating as an HTTP server. NF 200 operating as the HTTP client includes in the SBI request message a 3gpp-Sbi-Sender-Timestamp header with a timestamp value indicating the time that the SBI request message was transmitted and a 3gpp-Sbi-Max-Rsp-Time header value of 300 ms. NF 202 operating as the HTTP server receives the SBI request at the time 4 Aug. 2019 08:49:38:155 GMT. NF 202 operating as the HTTP server reads the 3gpp-Sbi-Sender-Timestamp value from the SBI request message, adds the 3gpp-Sbi-Max-Rsp-Time header value to the 3gpp-Sbi-Sender-Timestamp value and determines that the sum is 4 Aug. 2019 08:49:37.845+300=4 Aug. 2019 08:49:38.145. However, the time of receipt of the SBI request message is 4 Aug. 2019 08:49:38:155, which is after expiry of the maximum response time, i.e., after a time equal to the sum of the sender timestamp and the maximum response time. Because the time of receipt of the SBI request message is after the expiry of the maximum response time, in step 2, NF 202 operating as the HTTP server sends a 504 gateway timeout response to NF 200 operating as the HTTP client.

The case illustrated in FIG. 3 does not waste server resources because the SBI request is not processed. However, FIG. 4 illustrates a more problematic case when the SBI request is received on time and is processed, but the response fails to arrive at the NF operating as the HTTP client before the response timeout. Referring to FIG. 4, in step 1, NF 200 operating as the HTTP client generates and sends an SBI request message to NF 202 operating as an HTTP server. NF 200 operating as the HTTP client includes in the SBI request message a 3gpp-Sbi-Sender-Timestamp header with a timestamp value indicating the time that the SBI request message was transmitted and a 3gpp-Sbi-Max-Rsp-Time header value of 300 ms. NF 202 operating as the HTTP server receives the SBI request at the time 4 Aug. 2019 08:49:37:945 GMT. NF 202 operating as the HTTP server reads the 3gpp-Sbi-Sender-Timestamp value from the SBI request message, adds the 3gpp-Sbi-Max-Rsp-Time header value to the 3gpp-Sbi-Sender-Timestamp value and determines that the sum is 4 Aug. 2019 08:49:37.845+300=4 Aug. 2019 08:49:38.145. The time of receipt of the SBI request message is 4 Aug. 2019 08:49:37:945, which is before the expiry of the maximum response time. Because the time of receipt of the SBI request message is before the expiry of the maximum response time, NF 202 operating as the HTTP server processes the message. However, during the processing of the message, the maximum response time expires. Accordingly NF 202 operating as the HTTP server sends a 504 gateway timeout response to NF 200 operating as the HTTP client.

Figure 5:
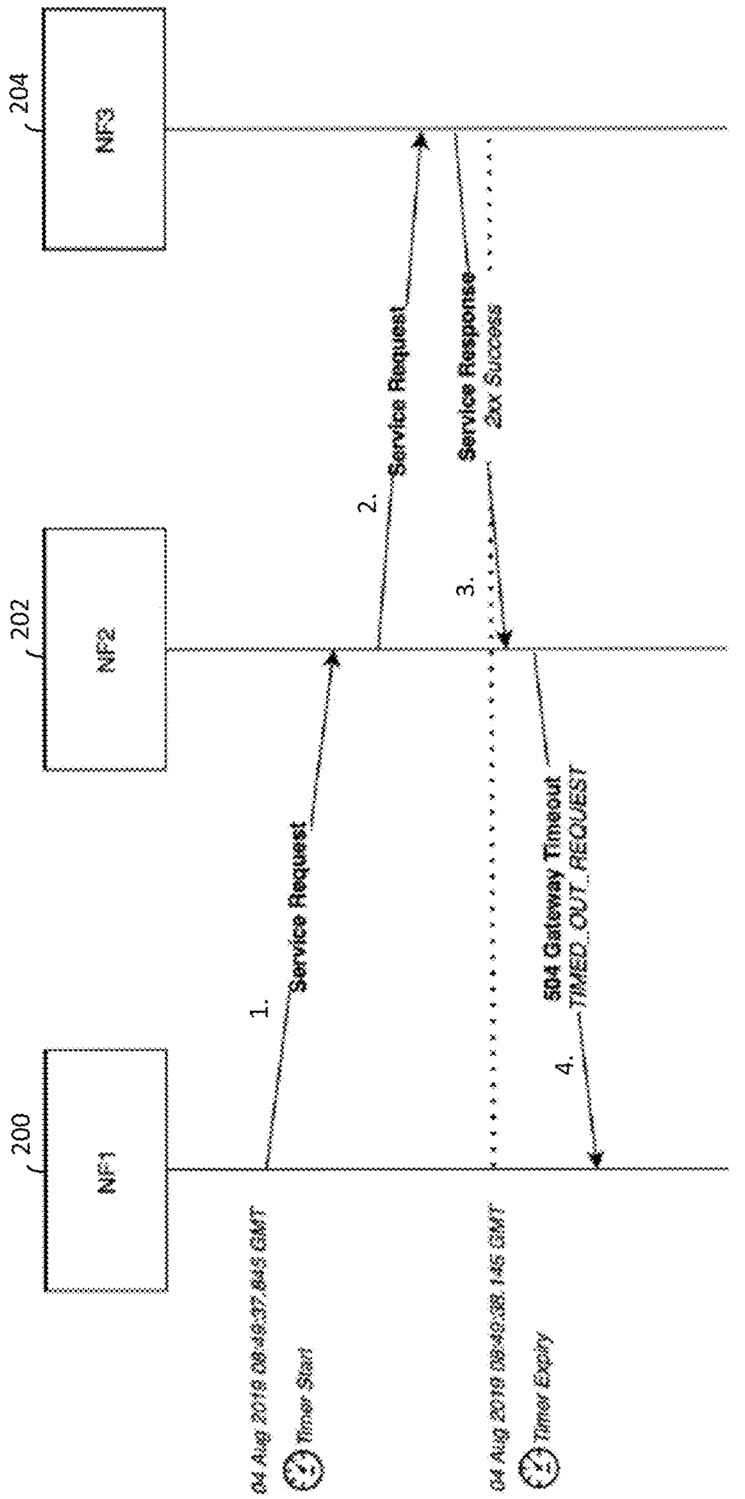
FIG. 5 is a message flow diagram illustrating the inefficient utilization of upstream NF resources when a downstream NF processes an SBI request before the expiry of the maximum response time, and a timeout occurs before the response reaches the originator of the SBI request.

In the scenario depicted in FIG. 4, the request processing could not be completed in time and is aborted mid-way, resulting in a 504 gateway timeout response is sent towards the HTTP client. Hence the resources consumed during the partial processing of the request is sub-optimal and inefficient. Such resources may include local CPU, memory, inter-NF network bandwidth as well as resources on one or more upstream NF(s). FIG. 5 is a message flow diagram illustrating the inefficient utilization of upstream NF resources when a downstream NF processes an SBI request before the expiry of the maximum response time, and a timeout occurs before the response reaches the originator of the SBI request. Referring to FIG. 5, in step 1, NF 200 operating as the HTTP client generates and sends an SBI request message to NF 202 operating as an HTTP server. NF 200 operating as the HTTP client includes in the SBI request message a 3gpp-Sbi-Sender-Timestamp header with a timestamp value indicating the time that the SBI request message was transmitted and a 3gpp-Sbi-Max-Rsp-Time header value of 300 ms. NF 202 operating as the HTTP server receives the SBI request, determines that the maximum response time has not expired, and, in step 2, forwards the request to another NF 204 operating as an HTTP server. NF 204 receives the request, determines that the maximum response time has not expired, processes the request, and, in step 3, sends a success response message to NF 202. NF 202 receives the response, determines that the maximum response time has expired, and, in step 4, sends a 504 gateway timeout message to NF 200. Thus, in FIG. 5, processing resources of both NF 202 and upstream NF 204 are wasted due to the failure to return the response message within the timeout period.

Figure 6:
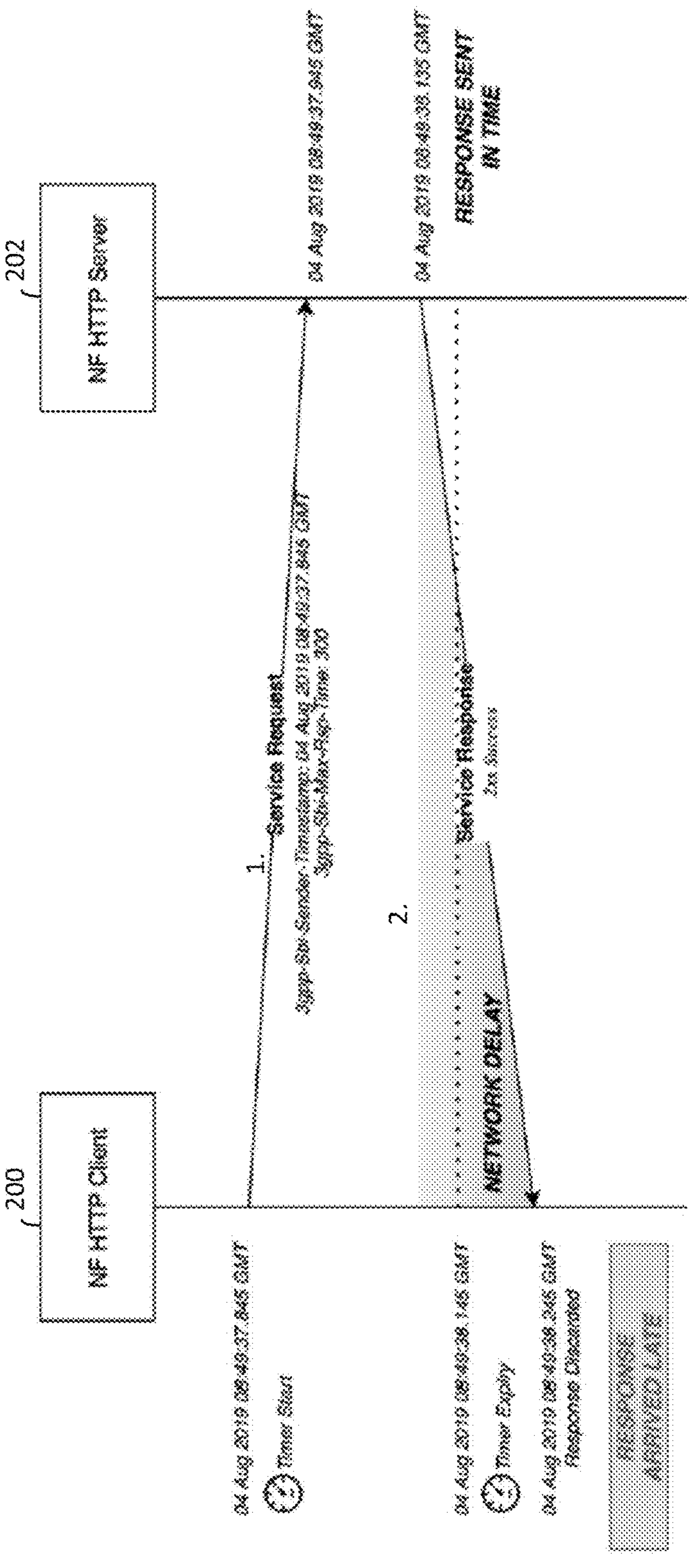
FIG. 6 is a message flow diagram illustrating exemplary messages exchanged when an NF operating as an HTTP server receives and processes an SBI request prior to expiration of the maximum response time but the message fails to reach the NF operating as the HTTP client before the maximum response time expires.

FIG. 6 is a message flow diagram illustrating exemplary messages exchanged when an NF operating as an HTTP server receives and processes an SBI request prior to expiration of the maximum response time but the message fails to reach the NF operating as the HTTP client before the maximum response time expires. Referring to FIG. 6, in step 1, NF 200 operating as the HTTP client generates and sends an SBI request message to NF 202 operating as an HTTP server. NF 200 operating as the HTTP client includes in the SBI request message a 3gpp-Sbi-Sender-Timestamp header with a timestamp value indicating the time that the SBI request message was transmitted and a 3gpp-Sbi-Max-Rsp-Time header value of 300 ms. NF 202 operating as the HTTP server receives the SBI request at the time 4 Aug. 2019 08:49:37:945 GMT. NF 202 operating as the HTTP server reads the 3gpp-Sbi-Sender-Timestamp value from the SBI request message, adds the 3gpp-Sbi-Max-Rsp-Time header value to the 3gpp-Sbi-Sender-Timestamp value and determines that the sum is 4 Aug. 2019 08:49:37.845+300=4 Aug. 2019 08:49:38.145. The time of receipt of the SBI request message is 4 Aug. 2019 08:49:37:945, which is before the expiry of the maximum response time. Because the time of receipt of the SBI request message is before the expiry of the maximum response time, NF 202 operating as the HTTP server processes the message. NF 202 operating as the HTTP server completes processing of the SBI request message at 4 Aug. 2019 08:49:38:135, which is prior to the expiration of the maximum response time. Accordingly, in step 2, NF 202 operating as the HTTP server generates and sends a success response to NF 200 operating as the HTTP client. However, the response arrives at 4 Aug. 2019 08:49:38:245, which is after the expiration of the maximum response time. Accordingly, NF 200 operating as the HTTP client ignores the response, is required to retransmit the SBI request, and processing resources of both NFs 200 and 202 are wasted.

To address the difficulties illustrated in FIGS. 4-6, an NF operating as an HTTP server may determine a predicted time required to process an SBI request message and return a response to the SBI request message and abort processing of the SBI request message if the NF determines that processing of the SBI request message cannot be completed within the maximum response time period. In particular, when an NF operating as an HTTP server receives a service request from an NF operating as an HTTP client, the NF operating as the HTTP server determines whether the request has already timed out on the HTTP client as defined in 3GPP TS 29.500, clause 6.11.2.2. Additionally, the NF operating as the HTTP server predicts the processing time required based on several factors described below and checks if the remaining time in the maximum response time period is greater than or equal to the predicted required processing time. The NF operating as the HTTP server may start processing of the request message only when the request has not already timed out and the maximum remaining response time is greater than or equal to the predicted response time. If both conditions are not met, the NF operating as the HTTP server may transmit a 400 error response message to the NF operating as the HTTP client where the message includes or carries a cause value of INSUFFICIENT_RESPONSE_TIME. The error response message may also carry the predicted response time value so that the sender of the SBI request can adjust the value of the 3gpp-Sbi-Max-Rsp-Time header on any retransmission of the SBI request.

Figure 7:
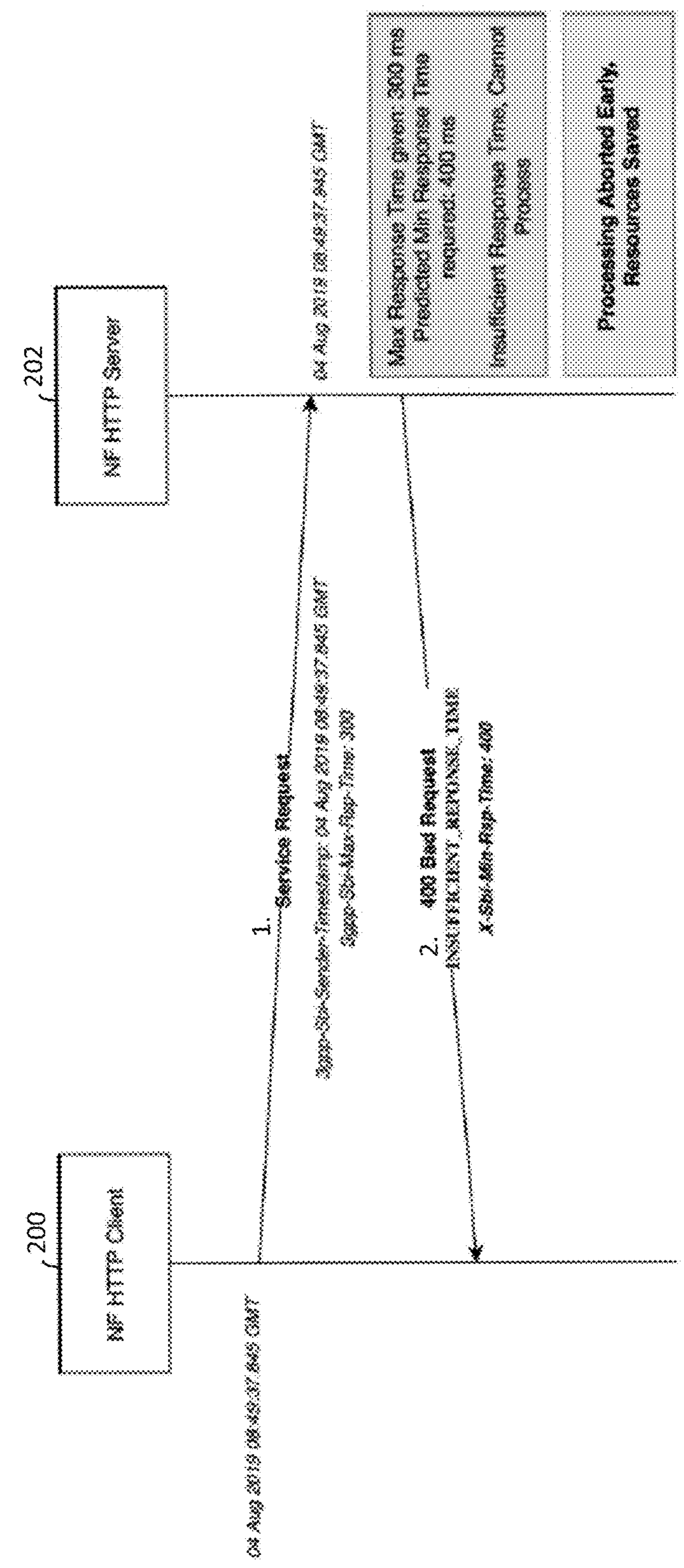
FIG. 7 is a message flow diagram illustrating exemplary messages exchanged when an NF operating as an HTTP server receives an SBI request prior to expiration of the maximum response time, predicts that a response cannot be delivered to the NF operating as the HTTP client before expiration of the maximum response time, and aborts processing of the SBI request.

FIG. 7 is a message flow diagram illustrating exemplary messages exchanged when an NF operating as an HTTP server receives an SBI request prior to expiration of the maximum response time, predicts that a response cannot be delivered to the NF operating as the HTTP client before expiration of the maximum response time, and aborts processing of the SBI request. Referring to FIG. 7, in step 1, NF 200 operating as an HTTP client generates and sends an SBI request message to NF 202 operating as an HTTP server. NF 200 operating as the HTTP client includes in the SBI request a 3gpp-Sbi-Sender-Timestamp header with a timestamp value indicating the time that the SBI request message was transmitted and a 3gpp-Sbi-Max-Rsp-Time header value of 300 ms. NF 202 operating as the HTTP server receives the SBI request at the time 4 Aug. 2019 08:49:37:945 GMT. NF 202 operating as the HTTP server reads the 3gpp-Sbi-Sender-Timestamp value from the SBI request message, adds the 3gpp-Sbi-Max-Rsp-Time header value to the 3gpp-Sbi-Sender-Timestamp value and determines that the sum is 4 Aug. 2019 08:49:37.845+300=4 Aug. 2019 08:49:38.145, which is after the time of receipt of the SBI request of 4 Aug. 2019 08:49:37:945. NF 202 operating as the HTTP server then predicts a minimum response time for the SBI request, where the minimum response time includes a predicted time for NF 202 operating as the HTTP server to process the request and for a response to be received by NF 200 operating as the HTTP client. In the illustrated example, NF 202 operating as the HTTP server predicts the minimum response time to be 400 ms. However, at the time of receipt of the SBI request by NF 202 operating as the HTTP server, only 200 ms remain before the maximum response time expires. Accordingly, rather than processing the SBI request only to have the request arrive late at NF 200 operating at the HTTP client, NF 202 operating as the HTTP server aborts processing of the request, and, in step 2, sends a 400 error response message with a code indicating that an insufficient response time remains to process the request. NF 202 operating as the HTTP server may also communicate, to NF 200 operating as the HTTP client and in error response message, the predicted minimum response time.

The procedure illustrated in FIG. 7 saves resources on the NF operating as the HTTP server and on other upstream NF(s) that would otherwise have been consumed unnecessarily, as by the time the response is prepared and/or reaches the NF operating as the HTTP client, the HTTP client would have timed out. The code or other indicator in the HTTP response indicates to the NF operating as the HTTP client that the request was rejected due to insufficient time provided in the 3gpp-Sbi-Max-Rsp-Time header and that the HTTP client may retry after increasing the value carried in the 3gpp-Sbi-Max-Rsp-Time header. To assist NF 200 operating as the HTTP client in determining the new maximum response time value, the NF operating as the HTTP server may also include, in the error response, a custom header defined as follows:

X-Sbi-Min-Rsp-Time

The header indicates the minimum duration, expressed in milliseconds since the request was originated, that is required to complete the processing of the request, including the network transit time.

Example: X-Sbi-Min-Rsp-Time: 15000

Parameters for Required Response Time Prediction

The following factors/parameters may be used in determining the required response time prediction.

Service Operation

One category of parameter that may be used by an NF operating as an HTTP server to determine the required response time to process an SBI request message is the service operation type requested by an SBI request message. A combination of the 3GPP-defined service name, resource uniform resource identifier (URI) and HTTP method may be used to determine the service operation type. These parameters indicate the nature of the service request and directly imply the processing time of the particular service request. Table 1 shown below illustrates examples of service-operation-related parameters that may be used by an NF operating as an HTTP server to predict the required response time.

TABLE 1

Service-Operation-Related Parameters Usable for Response Time Prediction

| Service Name | HTTP Method | Resource URI | Service Operation Name | Service Operation Description |
|---|---|---|---|---|
| npcf-smpolicycontrol | POST | .../sm-policies | Npcf_SMPolicy Control_Create | Request to create a session management (SM) policy association with the PCF to receive the policy for a packet data unit (PDU) session. |

TABLE 1-continued

Service-Operation-Related Parameters Usable for Response Time Prediction

| Service Name | HTTP Method | Resource URI | Service Operation Name | Service Operation Description |
|---|---|---|---|---|
| nudr-dr | POST | .../policy-data/subs-to-notify | Nudr_PolicyData Subscriptions_ Create | Create a subscription to receive notification of policy data changes. |
| nbsf-management | GET | .../nbsf-management/v1/pcfbinding | Nbsf_Management_ Discovery | Retrieve or discover the session binding information from the BSF |
| Nchf-spendinglimitcontrol | DELETE | .../nchf-SpendingLimintControl_ Unsubscribe | Nchf_Spending LimitControl_ Unsubscribe | Unsubscribe from notification of changes in the status of all policy counters |

The parameters illustrated in Table 1 may be read from an SBI request message and used to determine a mean real-time processing latency and a historical processing latency for service operations of the same type. Examples of how to calculate the mean real-time and historical processing latencies will be described below.

Request Transit Time

Another factor that may be used in calculating the real-time processing latency is request transit time. The request transit time is the duration of time taken by the request message to travel in the network from the originating HTTP client (that inserted the 3gpp-Sbi-Sender-Timestamp) to the HTTP server. This parameter indicates the time that the response message may take to reach the HTTP client.

Real-Time Mean Processing Latency

The real-time mean processing latency is the mean processing latency that is currently being observed by an NF for a similar service request type. Processing latency is defined as the duration of time taken by the NF operating as the HTTP server to process the request message and prepare a response, starting from the instance of time when the SBI request is received at the application layer of the NF operating as the HTTP server to the time when the response is ready to be transmitted by the transport layer of the NF operating as the HTTP server. This duration is inclusive of any time spent within the NF operating as the HTTP server application process, e.g., CPU time, queue wait time, etc., or external communication with one or more upstream peers.

Figure 8:
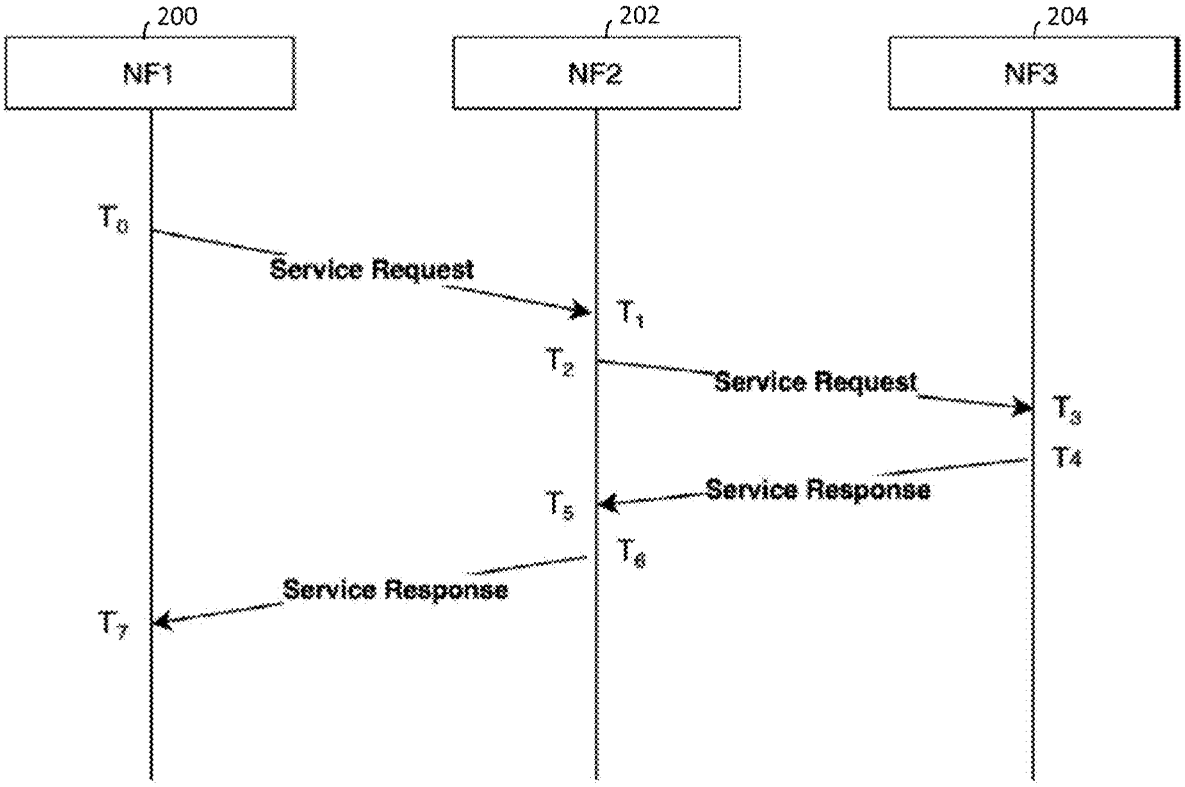
FIG. 8 is a message flow diagram illustrating various times associated with processing of an SBI request from which transit time and real-time processing latency can be determined.

FIG. 8 is a message flow diagram illustrating various times associated with processing of an SBI request from which transit time and real-time processing latency can be determined. In FIG. 8, the following time periods are defined:

($T_0$, $T_1$) is the network transit time of the service request from NF 200 to NF 202, ($T_0$, $T_7$) is the external latency observed by NF 200 which includes network transit time and processing time by NF 202 (that in turn includes further upstream processing time by NF 204), ($T_1$, $T_6$) is the processing latency observed by NF 202, ($T_2$, $T_5$) is the external latency observed by NF 202, and ($T_6$, $T_7$) is the network transit time of the service response from NF 202 to NF 200.

NF 202 may calculate the real-time mean processing latency for a specific sampling window using the following formula:

$$\bar{x} = \frac{\sum x}{n}$$

where, $\bar{x}$=sample mean value, x=every value of processing latency observed in the sampling time window, and n=number of observations in the sample.

Note: The sampling time window used to observe the current mean latency may be on the order of a few minutes. A smaller sampling window would yield greater accuracy at the cost of increased storage.

Standard Deviation

NF 202 may also calculate the standard deviation from the mean latency observed in the same sampling time window. This parameter covers for the jitter in the mean real-time latency. NF 202 may calculate the standard deviation from the mean real-time processing latency using the following formula.

$$s = \sqrt{\frac{1}{n-1}\sum_{i=1}^{n}(x_i - \bar{x})^2}$$

where, s=Standard deviation in the sampling time window, n=Number of observations in the sample, $x_i$=$i^{th}$ observation in the sample, and $\bar{x}$=sample mean value.

Historical Latency Records

Historical latency records may be used by an NF to calculate the predicted response time along with real-time mean processing latency. Historical processing latency may provide information which results in increased accuracy in response time prediction over using real-time mean processing latency alone. The following are examples of time periods over which the NF operating as the HTTP server may store historical latency records and use the data in the records to calculate the predicted response time:

1. Latency observed in the past for a similar time of day,
2. Latency observed in the past for a similar day of week, and
3. Latency observed in the past for a similar day of year.

Historical data may influence the prediction based on current values for better accuracy. The accuracy may improve over the time with more data collected. For example, the processing/network latencies may be different at the following times:

2 AM—relatively idle (faster) networks and network functions due to off-peak time, 11 AM on a weekday—busier networks due to increased human/IoT activities, and 6 PM on Christmas Eve—busier than usual days due to celebrations affecting network processing.

Required Processing Time Prediction Algorithm

An NF operating as an HTTP server may calculate the required processing time for an SBI request message using a combination of real-time processing metrics and historical processing metrics, examples of each of which will now be described.

Real-Time Processing Metrics

An NF operating as an HTTP server, in order to predict the required processing time in the current sampling window for a given service operation, may maintain a data structure in its memory to cache the real-time latency data, as shown in the example in Table 2 below.

TABLE 2

Real-Time Processing Metrics

| Service Operation | Network Latency ($l_r$) | Mean Processing Latency ($L_r$) | Standard Deviation (D) |
|---|---|---|---|
| Npcf_SMPolicyControl_Create | 70 ms | 110 ms | 12.0 ms |
| Nbsf_Management_Discovery | 28 ms | 52 ms | 6.5 ms |
| . . . | | | |

An NF operating as an HTTP server may calculate and store the real-time processing metrics illustrated in Table 2 for different service operation types and use the real-time processing metrics to compute the predicted response time in a manner that will now be described.

The predicted response time for the given service operation in the current sampling window may be calculated as follows:

$$P_r = 2l_r + L_r \times D_f$$

where, $P_r$=Predicted response time based on current metrics, $l_r$=Current network latency (time taken by request message to reach the NF operating as the HTTP server), and $L_r$=Mean processing latency on the NF operating as the HTTP server, and $D_f$=Standard deviation factor, which is defined as follows $$D_f = 1 + \frac{D}{L_r}$$

where,

D=Standard deviation in the current sampling window.

Historical Processing Metrics

The processing metrics described above may be stored either locally at an NF or in an external fast lookup data store for later retrieval. Table 3 shown below illustrates an example of such storage schema.

TABLE 3

Stored Processing Metrics

| Sample Time Window | Day of Week | Day of Year | Service Operation | Network Latency ($l_n$) | Mean Processing Latency ($l_h$) |
|---|---|---|---|---|---|
| 9:00 AM to 9:05 AM | 1 | 175 | Npcf_SMPolicyControl_Create | 70 ms | 110 ms |
| 9:00 AM to 9:05 AM | 1 | 175 | Nbsf_Management_Discovery | 28 ms | 52 ms |
| . . . | | | | | |
| 11:00 AM to 11:05 AM | 1 | 175 | Npcf_SMPolicyControl_Create | 85 ms | 135 ms |
| . . . | | | | | |

Note: The storage may be optimized for indexed lookups based on sample time window (including day of week (DOW) and day of year (DOY)) and service operation type.

The response time for the given service operation using historical data for the given time-of-day, day-of-week, and day-of-year may be determined as follows:

$$P_h = 2l_h + L_h$$

where, $P_h$=Historical response time based on historical data, $l_h$=Historical network latency, and $L_h$=Historical mean processing latency on the NF operating as the HTTP server.

Predicted Response Time

The predicted response time to be applied at the current instance of time for the given service operation may be determined as follows:

$$P = \frac{P_r + P_h}{2}$$

where,

P=Predicted response time, $P_f$=Predicted response time based on current metrics, and $P_h$=Response time based on historical data.

Note: This formula gives equal weightage to the current and historical data. This weightage factor can be made configurable so that it can be tuned based on network/application/hardware performance advancements as indicated by the following formula:

$$P = \frac{m \times P_r + n \times P_h}{m + n}$$

where, m=weightage for current data, and n=weightage for historical data.

Note: In the above formula for predicted response time, m=n=1.

Admission Control Algorithm

The NF operating as the HTTP server may use the following algorithm to determine whether or not to abort processing of an SBI request based on the predicted response time:

If (3gpp-Sbi-Sender-Timestamp+3gpp-Sbi-Max-Rsp-Time)>CurrentTime+P then admit incoming signaling request for processing else reject signaling request with error code 400 (bad request) and cause "INSUFFICIENT_RESPONSE_TIME"

and add custom header X-Sbi-Min-Rsp-Time.

Note: P is the predicted minimum processing time calculated as described above.

Assumptions

The following assumptions are made in operating a network in accordance with the methodologies described herein:

1. NFs operating as HTTP clients and NFs operating as HTTP servers in the SBI network deployment are synchronized using a timing synchronization protocol, such as network time protocol (NTP), as recommended by 3GPP TS 29.500; and
2. NF operating as HTTP clients originating request messages must include in SBI request messages the 3gpp-Sbi-Sender-Timestamp and the 3gpp-Sbi-Max-Rsp-Time headers as defined by 3GPP in TS 29.500.

Figure 9:
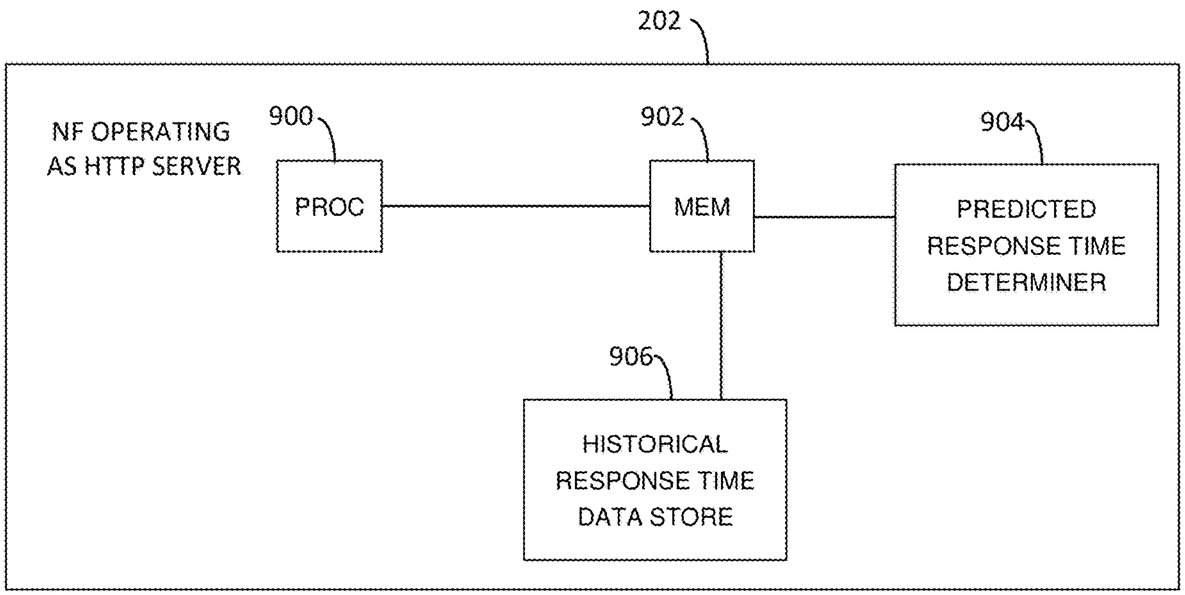
FIG. 9 is a block diagram illustrating an exemplary architecture for an NF operating as an HTTP server that performs intelligent admission control by calculating and using predicted response times in processing SBI request messages.

FIG. 9 is a block diagram illustrating an exemplary architecture for an NF operating as an HTTP server that performs intelligent admission control by calculating and using predicted response times in processing SBI request messages. Referring to FIG. 9, NF 202 operating as the HTTP server includes at least one processor 900 and a memory 902. NF 202 operating as the HTTP server further includes a predicted response time determiner 904 that determines predicted response times for SBI request messages using the methodology described above and allows or aborts processing of the SBI request message based on whether the predicted response time exceeds the maximum response time defined by the 3gpp-Sbi-Max-Rsp-Time and 3gpp-Sbi-Sender-Timestamp header values. NF 202 operating as the HTTP server also includes a historical response time data store 906 that stores historical response time metrics usable by predicted response time determiner 904 in calculating the predicted response time. NF 202 may be any type of 3GPP-defined network function or other network function that processes SBI request messages, including the NF types illustrated in FIG. 1. Predicted response time determiner 904 may be implemented using computer executable instructions stored in memory 902 and executed by processor 900.

Figure 10:
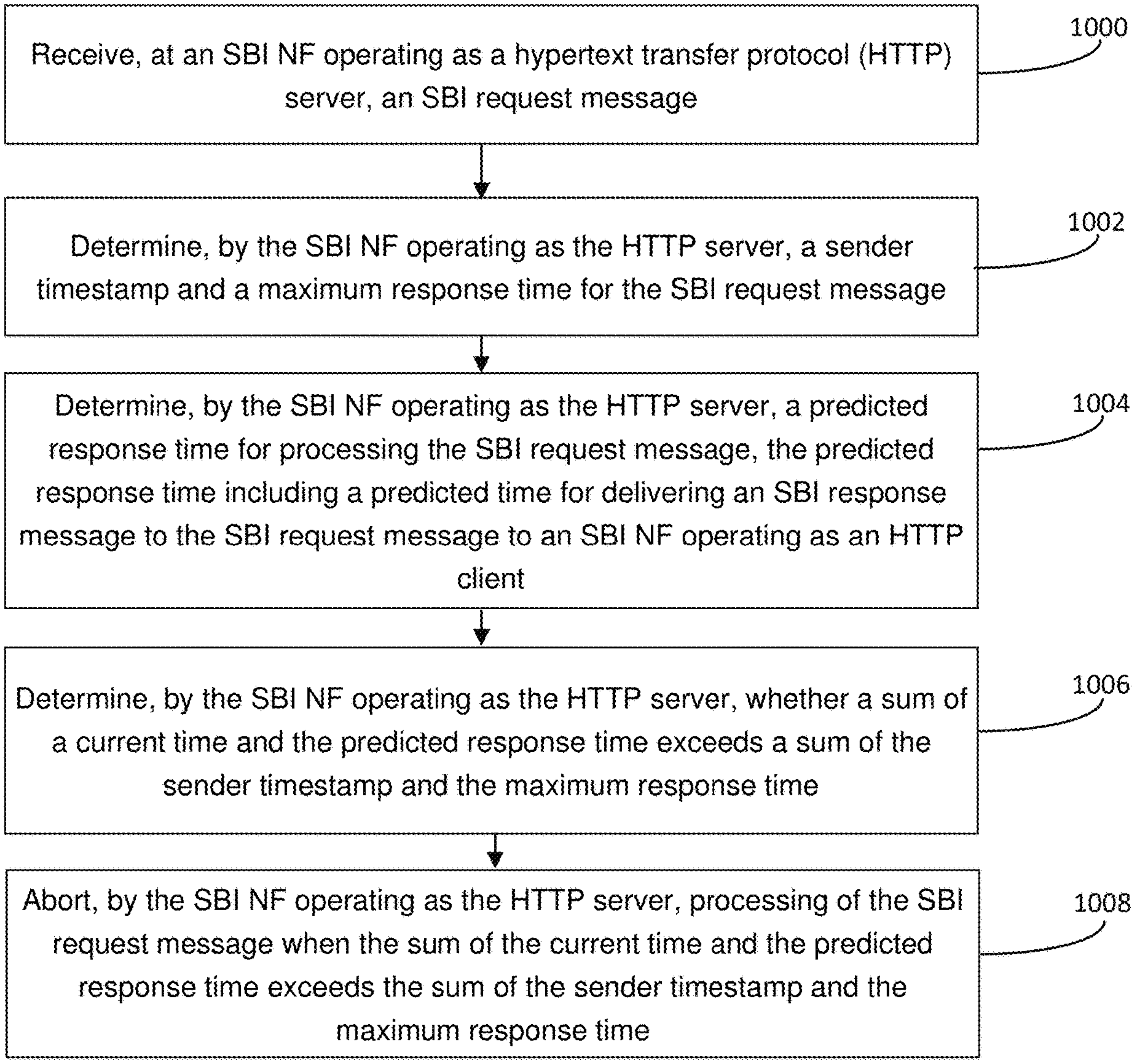
FIG. 10 is a flow chart illustrating an exemplary process for intelligent admission control in processing SBI request messages.

FIG. 10 is a flow chart illustrating an exemplary process for intelligent admission control in processing SBI request messages. Referring to FIG. 10, in step 1000, the process includes receiving, at an SBI NF operating as a hypertext transfer protocol (HTTP) server, an SBI request message. For example, an NF, such as NF 202, may receive an SBI request message that includes a 3gpp-Sbi-Max-Rsp-Time value and a 3gpp-Sbi-Sender-Timestamp value.

In step 1002, the process further includes determining, by the SBI NF operating as the HTTP server, a sender timestamp and maximum response time for the SBI request message. For example, an NF, such as NF 202, may determine the sender timestamp by reading the sender timestamp from the 3gpp-Sbi-Max-Rsp-Time header and the maximum response time by reading the maximum response time from the 3gpp-Sbi-Max-Rsp time header.

In step 1004, the process further includes determining, by the SBI NF operating as the HTTP server, a predicted response time for processing the SBI request message, the predicted response time including a predicted time for delivering an SBI response message to the SBI request message to an SBI NF operating as an HTTP client. For example, an NF, such as NF 202, may calculate the predicted response time using a combination of predicted real-time mean processing latency and historical processing latency using the formulas described above.

In step 1006, the process further includes determining, by the SBI NF operating as the HTTP server, whether a sum of the current time and the predicted response time exceeds a sum of sender timestamp and the maximum response time. For example, an NF, such as NF 202, may compare the sum of the sender timestamp and maximum response time and the sum of the current time and the predicted response time to determine whether a response to the SBI request can be delivered to the SBI request message originator before the maximum response time is reached.

In step 1008, the process further includes aborting, by the SBI NF operating as the HTTP server, processing of the SBI request message when the sum of the current time and the predicted response time exceeds the sum of the sender timestamp and the maximum response time. For example, an NF, such as NF 202, may abort further processing of an SBI request when the NF determines that a response to the SBI request cannot be delivered to the originator of the SBI request within the timeout period defined by the sum of the sender timestamp and the maximum response time, even when the SBI request message is received before expiration of the timeout period. The NF operating as the HTTP server may send an error response to the SBI request message originator and include, in the error response, the calculated predicted response time value so that the SBI request message originator can use the predicted response time to set the value of the 3gpp-Sbi-Max-Rsp-Time header to a value that is less likely to result in an SBI response timeout in a retransmission of the SBI request message.

Exemplary advantages of the subject matter described herein include reducing the likelihood of wasting processing resources of NFs operating as HTTP servers by aborting processing of SBI request messages when the NFs determine that the processing and/or delivery of corresponding SBI response messages cannot be completed within the maximum response timeout period. The subject matter also reduces the likelihood of wasting processing resources of NFs operating as HTTP clients by reducing the likelihood of SBI request retransmissions. Network bandwidth is also conserved by reducing the likelihood of SBI message retransmissions.

The disclosure of each of the following references is hereby incorporated herein by reference in its entirety.

REFERENCES 1. 3rd Generation Partnership Project; Technical Specification Group Core Network and Terminals; 5G System; Network Function Repository Services; Stage 3 (Release 19) 3GPP TS 29.510 V19.0.0 (2024-09)
2. 3rd Generation Partnership Project; Technical Specification Group Core Network and Terminals; 5G System; Technical Realization of Service Based Architecture; Stage 3 (Release 19) 3GPP TS 29.500 V19.0.0 (2024-09)
3. 3rd Generation Partnership Project; Technical Specification Group Core Network and Terminals; 5G System; Session Management Policy Control Service; Stage 3 (Release 19) 3GPP TS 29.512 V19.0.0 (2024-09)
4. 3rd Generation Partnership Project; Technical Specification Group Core Network and Terminals; 5G System; Binding Support management Service; Stage 3 (Release 19) 3GPP TS 29.521 V19.0.0 (2024-09)

5. 3rd Generation Partnership Project; Technical Specification Group Core Network and Terminals; 5G System; Usage of the Unified Data Repository service for Policy Data, Application Data, and Structured Data for Exposure; Stage 3 (Release 19) 3GPP TS 29.519 V19.0.1 (2024-09)

6. 3rd Generation Partnership Project; Technical Specification Group Core Network and Terminals; 5G System; Spending Limit Control Service; Stage 3 (Release 19) 3GPP TS 29.594 V19.0.0 (2024-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for intelligent admission control in service-based interface (SBI) network functions (NFs), the method comprising:

receiving, at an SBI NF operating as a hypertext transfer protocol (HTTP) server, an SBI request message;

determining, by the SBI NF operating as the HTTP server, a maximum response time and a sender timestamp for the SBI request message;

determining, by the SBI NF operating as the HTTP server, a predicted response time for processing the SBI request message, the predicted response time including a predicted time for delivering an SBI response message to the SBI request message to an SBI NF operating as an HTTP client;

determining, by the SBI NF operating as the HTTP server, whether a sum of a current time and the predicted response time exceeds a sum of the sender timestamp and the maximum response time; and aborting, by the SBI NF operating as the HTTP server, processing of the SBI request message when the sum of a current time and the predicted response time exceeds a sum of the sender timestamp and the maximum response time.

2. The method of claim 1 wherein receiving the SBI request message includes receiving an SBI request message before a time equal to the sum of the sender timestamp and the maximum response time.

3. The method of claim 1 determining the maximum response time and the sender timestamp includes reading the maximum response time from a 3gpp-Sbi-Max-Rsp-Time header of the SBI request message and reading the sender timestamp from a 3gpp-Sbi-Sender-Timestamp header of the SBI request message.

4. The method of claim 1 wherein determining the predicted response time for the SBI request message includes calculating a predicted minimum response time required for completing processing of the SBI request message and delivering the SBI response message to the SBI NF operating as the HTTP client.

5. The method of claim 4 wherein calculating the predicted minimum response time includes calculating a real-time mean processing latency for the SBI request message.

6. The method of claim 5 wherein calculating the predicted minimum response time includes calculating a historical response time for the SBI request message given a service operation type of the SBI request message.

7. The method of claim 6 wherein calculating the predicted minimum response time includes calculating an average of the real-time mean processing latency and the historical response time.

8. The method of claim 7 wherein calculating the average includes weighting at least one of the real-time mean processing latency and the historical response time.

9. The method of claim 1 comprising communicating the predicted response time by the SBI NF operating as the HTTP server and to the SBI NF operating as the HTTP client.

10. The method of claim 1 comprising, when the NF operating as the HTTP server determines that the sum of the time of receipt of the SBI request message and the predicted response time does not exceed the sum of the sender timestamp and the maximum response time, processing the SBI request message and transmitting the SBI response message to the NF operating as the HTTP client.

11. A system for intelligent admission control in service-based interface (SBI) network functions (NFs), the system comprising:

an NF including at least one processor and a memory, the NF being configured to operate as an HTTP server; and a predicted response time determiner executable by the at least one processor for receiving an SBI request message, determining a maximum response time and a sender timestamp for the SBI request message, determining a predicted response time for processing the SBI request message, the predicted response time including a predicted time for delivering an SBI response message to the SBI request message to an SBI NF operating as an HTTP client, the predicted response time determiner for determining whether a sum of a current time and the predicted response time exceeds a sum of the sender timestamp and the maximum response time, and aborting processing of the SBI request message when the sum of the current time and the predicted response time exceeds the sum of the sender timestamp and the maximum response time.

12. The system of claim 11 wherein the predicted response time determiner receives the SBI request message before a time equal to the sum of the sender timestamp and the maximum response time.

13. The system of claim 11 wherein the predicted response time determiner is configured to determine the maximum response time and the sender timestamp by reading the maximum response time from a 3gpp-Sbi-Max-Rsp-Time header of the SBI request message and reading the sender timestamp from a 3gpp-Sbi-Sender-Timestamp header of the SBI request message.

14. The system of claim 11 wherein the predicted response time determiner is configured to determine the predicted response time for the SBI request message by calculating a predicted minimum response time required for completing processing of the SBI request message and delivering the SBI response message to the SBI NF operating as the HTTP client.

15. The system of claim 14 wherein the predicted response time determiner is configured to determine the predicted minimum response time by calculating a real-time mean processing latency for the SBI request message.

16. The system of claim 15 wherein the predicted response time determiner is configured to calculate the predicted minimum response time by calculating a historical response time for the SBI request message given a service operation type of the SBI request message.

17. The system of claim 16 wherein the predicted response time determiner is configured to calculate the predicted minimum response time by calculating an average of the real-time mean processing latency and the historical response time.

18. The system of claim 17 wherein the predicted response time determiner is configured to calculate the average by weighting at least one of the real-time mean processing latency and the historical response time.

19. The system of claim 11 the predicted response time determiner is configured to communicate the predicted response time to the SBI NF operating as the HTTP client.

20. A non-transitory computer readable medium having stored thereon executable instructions that when executed by a processor of a computer control the computer to perform steps comprising:

receiving, at a service-based interface (SBI) NF operating as a hypertext transfer protocol (HTTP) server, an SBI request message;

determining, by the SBI NF operating as the HTTP server, a sender timestamp and maximum response time for the SBI request message;

determining, by the SBI NF operating as the HTTP server, a predicted response time for processing the SBI request message, the predicted response time including a predicted time for delivering an SBI response message to the SBI request message to an SBI NF operating as an HTTP client;

determining, by the SBI NF operating as the HTTP server, whether a sum of a current time and the predicted response time exceeds a sum of the sender timestamp and the maximum response time; and aborting, by the SBI NF operating as the HTTP server, processing of the SBI request message when the sum of the current time and the predicted response time exceeds a sum of the sender timestamp and the maximum response time.

* * * * *